United States Patent Office 3,114,761
Patented Dec. 17, 1963

3,114,761
THIOPHOSPHORIC ACID ESTER COMPOUNDS HAVING P—S—N—P LINKAGE
Glenn R. Price, South Chicago Heights, and Edward N. Walsh, Chicago Heights, Ill., and James T. Hallett, Saratoga, Calif., assignors to Stauffer Chemical Company, New York, N.Y., a corporation of Delaware
No Drawing. Filed Nov. 17, 1961, Ser. No. 153,240
9 Claims. (Cl. 260—461)

This invention is directed to a new class of phosphorus containing compounds, their method of use as plant growth regulators and insecticides, and a process of preparing these compounds as well as imide, sulfonimide, and sulfonamide derivatives of phosphorothioic acids generally.

The new compounds of the invention may be represented by the general formula:

$$\begin{array}{c} R^1O \quad X \qquad\qquad Y \quad OR^4 \\ \diagdown\|\qquad\qquad\quad\|\diagup \\ P-S-N-P \\ \diagup \qquad | \qquad \diagdown \\ R^2O \qquad R^3 \quad OR^5 \end{array}$$

wherein $R^1$, $R^2$, $R^4$, and $R^5$ are the same or different alkyl radicals, $R^3$ is a lower alkyl or phenyl, and X and Y are selected from the group consisting of sulfur and oxygen. Among the suitable alkyl radicals for the phosphorus ester portions of the molecule are methyl, ethyl, propyl, butyl, amyl, octyl, decyl, etc. These phosphoramidates have been found to be useful as insecticides and herbicides.

In addition to the above compounds, the method of the present invention is generally applicable to the preparation of imide, sulfonimide and sulfonamide derivatives of phosphoromonothioic and phosphorodithioic acids. The imides and sulfonimides which may be prepared include organic cyclic radicals in which the nitrogen of the above formula is intramolecularly connected to two of the same or different acidic groups (sulfonyl or carbonyl) which in turn are linked by alkylene, arylene, or napthalene to form the cyclic structure. More specifically, the included imido members are those having two carbonyl groups immediately adjacent to the imido nitrogen, e.g., phthalimido, glutarimido, naphthalimido, and succinimido, while the sulfonimido members are those having either two sulfonyl groups, e.g. O-benzene disulfonimido, or those with one sulfonyl and one carbonyl, e.g. O-benzoic sulfonimido. The amides which may be prepared are the noncyclic organic derivatives of ammonia in which either one or two sulfonyl, carbonyl, or phosphoro ester groups are connected immediately adjacent to the nitrogen atom of the above formula. Suitable amido groups include phenyl sulfonyl; p-nitrophenyl sulfonyl; acetyl; p-bromophenyl sulfonyl; diethyl sulfonyl; benzoyl; and O,O-diethyl phosphoryl. When the amide comprises only one acidic or phosphoro group the second group connected to the amido nitrogen will be alkyl, aryl, alkaryl, or aralkyl such as methyl, ethyl, propyl, butyl, octyl, decyl, phenyl, p-nitrophenyl, p-chlorophenyl, 2-chloro-4-nitrophenyl, p-methoxyphenyl, ethylbenzyl, tolyl, xylyl, etc.

The novel compounds of the invention are preferably prepared according to the following general equation:

$$\begin{array}{c} R^1O \quad X \\ \diagdown\| \\ P-S-Hal + ZH + (acceptor) \longrightarrow \\ \diagup \\ R^2O \end{array}$$

$$\begin{array}{c} R^1O \quad X \\ \diagdown\| \\ P-S-Z + (acceptor)\cdot H\text{-Hal} \\ \diagup \\ R^2O \end{array}$$

wherein X, $R^1$, and $R^2$ are as defined above, Hal stands for halogen, preferably chlorine or bromine, "acceptor" stands for a hydrogen halide acceptor such as triethylamine, pyridine and the like, and Z stands for a nitrogen-containing imido, sulfonimido, amido, or phosphoroamido having a structure in which said nitrogen atom is connected to at least one $$-\overset{O}{\overset{\|}{C}}-,\quad -SO_2-,\quad \text{or}\quad -\overset{Y}{\overset{\|}{P}}\overset{OR^4}{\diagdown OR^5}$$

radicals wherein Y, $R^4$, and $R^5$ are as defined above.

While it is preferred to carry out the reaction in the presence of a hydrogen halide acceptor to prevent possible side reactions between product and halogen acid, this is not a critical requirement. In fact, some of the products which may be prepared by the method of the invention are uneffected by the presence of halogen acid. Another possible source of processing difficulty arises if the phosphorosulfenyl halide [shown in the equation as $(R^1O)(R^2O)P(X)$—S—Hal] is easily hydrolyzed. To avoid this difficulty it is preferable to conduct the above reactions in a non-aqueous organic solvent such as ether, benzene, hexane, carbon tetrachloride, and the like. A majority of the reactions following the above equation are exothermic and may be cooled by the usual means such as an ice bath, etc. In this regard it is desirable to maintain the reaction temperature at 100° C. or below to avoid decomposition of the reactants. Suitable reaction rates may be obtained at temperatures as low as −100° C. Preferably, however, the reaction temperature is maintained in the range of from about −20° C. to about 50° C. Because of the near-quantitative yields obtained by the present method, the reactants are normally used in stoichiometric proportions, that is, about one mole of phosphoro sulfenyl halide is reacted with about one mole of the selected amide, imide, sulfonimide or phosphoroamidate (shown in the equation as ZH). After complete reaction, the crude mixture is filtered and solvent is removed under vacuum.

Among the advantages of the present process are the ease of preparing the intermediate sulfenyl halide and the wide variety of compounds which may be prepared in high yields therefrom. For example, in the general process used heretofore for the manufacture of derivatives of phosphorothioic acids by reaction between the alkali metal salts of thiol- or thionothiolphosphoric acids with N-halo-amides or imides (see, e.g., U.S. Patent 2,995,568) it was impossible to manufacture in satisfactory yields the novel phosphoroamidates of the present invention. But even more significantly, because of the inability to chlorinate various reactive amides, imides and sulfonimides without reaction elsewhere in the molecule, a large number of desirable derivatives could not be prepared by the prior art methods. The reactants of the present method avoid this problem since the halogen atom is connected to the phosphorosulfenate reactant. Thus the present process supplies (1) a method of preparing the new phosphoroamidates and (2) an improved method for preparing various imide, amide and sulfonimide derivatives of phosphorothioic acids, some of which could not be satisfactorily prepared by prior art methods.

The following examples will serve to illustrate the method of the present invention and the novel compounds prepared thereby.

EXAMPLE 1

$$\begin{array}{c} H_3CO \quad O \qquad\qquad C_6H_5 \\ \diagdown\| \qquad\qquad\quad\diagup \\ P-S-N \\ \diagup \qquad\qquad\quad\diagdown \\ H_3CO \qquad\qquad SO_2-\!\!\!\!-\!\!\!\!\bigcirc\!\!\!\!-\!\!\!\!\text{Br} \end{array}$$

In a flask was placed 31.2 grams (0.10 mole) of N-(phenyl)-p-bromophenylsulfonamide and 12.1 grams (0.12 mole) of triethylamine in 150 ml. of ether. The solution was cooled to 20° C. and 17.6 grams (0.10 mole) of O,O-dimethylphosphorosulfenyl chloride was added over a 30 minute period. The reaction mixture was stirred for two additional hours at room temperature and filtered before removing the solvent under partial pressure. The product was concentrated to 50° C. at 1.0 mm. of Hg to yield 43.0 grams (95.2%) of N-(phenyl)-N-(O,O-dimethylphosphorothio)-p-bromophenylsulfonamide analyzing as 7.0% P, 13.2% S, and 17.7% Br as compared to 6.87% P, 14.1% S, and 17.7% Br. theoretical.

EXAMPLE 2

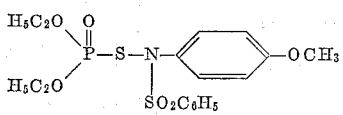

In a flask was placed 39.4 grams (0.15 mole) of N-(p-methoxyphenyl)-benzenesulfonamide and 15.1 grams (0.15 mole) of triethylamine in 150 ml. of ether. The solution was cooled to 10° C. and 30.6 grams (0.15 mole) of O,O-diethylphosphorosulfenyl chloride was added over a 30 minute period. The reaction mixture was then stirred at room temperature for 30 minutes and at reflux for 30 minutes before filtering and removing the solvent under partial pressure. The product was concentrated to 60° C. at 1.0 mm. of Hg to yield 61.0 grams (94.0%) of N-(p-methoxyphenyl)-N-(O,O-diethylphosphorothio)-benzenesulfonamide analyzing as 7.2% P and 14.7% S as compared to 7.17% P and 14.8% S theoretical.

EXAMPLE 3

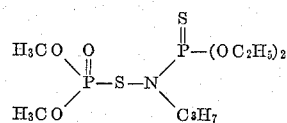

In a flask was placed 31.6 grams (0.15 mole) of N-(isopropyl)-O,O-diethylphosphoroamido thionate and 16.1 grams (0.16 mole) of triethylamine in 150 ml. of ether. The reaction mixture was cooled to 20° C. and 26.4 grams (0.15 mole) of O,O-dimethylphosphorosulfenyl chloride was added over a thirty period. After the addition was complete, the reaction mixture was stirred for two hours at room temperature before filtering and removing the solvent under reduced pressure. The reaction product was concentrated to 50° C. at 3.0 mm. of Hg to yield 50.0 grams (95.5%) of N-(isopropyl)-N-(O,O-dimethylphosphorothio)-O,O-diethylphosphoroamide thionate, $N_D^{25}=1.4899$ analyzing as 17.4% P and 18.2% S as compared to 17.6% P and 18.2% S theoretical.

EXAMPLE 4

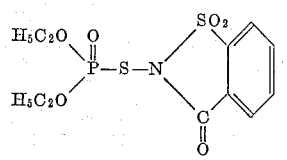

In a flask was placed 27.4 grams (0.15 mole) of o-benzoic sufonimide and 30.6 grams (0.15 mole) of O,O-diethylphosphorosulfenyl chloride in 150 ml. of ether. The reaction mixture was held at 20° C. or below while 15.1 grams (0.15 mole) of triethylamine was added dropwise over a 30 minute period. The reaction mixture was stirred for an additional hour at room temperature before it was filtered and the solvent was removed under partial pressure. The reaction mixture was concentrated to 50° C. at 1.5 mm. of Hg to yield 43.0 grams (99.5%) of N-(O,O-diethylphosphorothio)-o-benzoic sufonimide analyzing 8.2% P and 16.2% S as compared to 8.8% P and 18.1% S theoretical.

EXAMPLE 5

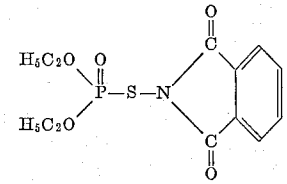

In a flask was placed 22.0 grams (0.15 mole) of phthalimide and 15.1 gram (0.15 mole) of triethylamine in 150 ml. of ether. The reaction mixture was held at room temperature while 30.6 grams (0.15 mole) of O,O-diethylphosphorosulfenyl chloride was added dropwise over a 45 minute period. The reaction mixture was stirred for an additional hour at room temperature, filtered, and the solvent removed under partial pressure. After concentrating to 50° C. at 1.0 mm. of Hg 37.0 grams of N-(O,O-diethylphosphorothio)-phthalimide was obtained analyzing as 9.0% P and 9.9% S as compared to 9.8% P and 10.2% S theoretical.

EXAMPLE 6

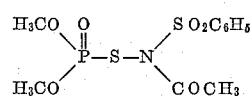

In a flask was placed 19.9 grams (0.10 mole) of N-(acetyl)-benzenesulfonamide and 12.0 grams (0.12 mole) of triethylamine in 150 ml. of ether. The solution was cooled to 15° C. and 17.6 grams (0.10 mole) of O,O-dimethylphosphorosulfenyl chloride was added over a 30 minute period. The reaction mixture was stirred for two additional hours at room temperature, filtered, and the solvent removed under reduced pressure. The product was concentrated to 50° C. at 2.0 mm. of Hg to yield 32.0 grams (94.5%) of N-(acetyl)-N-(O,O-dimethylphosphorothio)-benzenesulfonamide analyzing as 9.1% P and 18.8% S as compared to 8.1% P and 17.3% S theoretical.

EXAMPLE 7

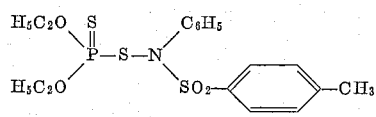

In a flask was placed 24.7 grams (0.10 mole) of N-(phenyl)-p-toluenesulfonamide and 12.1 grams (0.12 mole) of triethylamine in 150 ml. of ether. The solution was cooled to 0° C. and 20.4 grams (0.10 mole) of O,O-diethylphosphorothionosulfenyl chloride was added over a 30 minute period. The reaction mixture was heated to reflux for 30 minutes, filtered and the solvent removed under partial pressure. The reaction product was concentrated to yield 41.5 grams of N-(phenyl)-N(O,O-diethylphosphorodithio) - p - toluenesulfonamide, $N_D^{25}=1.5497$, analyzing as 6.8% P, and 19.1% S as compared to 7.2% P and 22.2% S. theoretical.

EXAMPLE 8

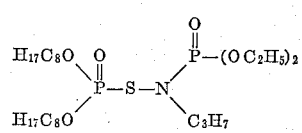

In a flask was placed 19.5 grams (0.10 mole) of N-(isopropyl)-O,O-diethylphosphoramidate and 11.1 grams (0.11 mole) of triethylamine in 150 ml. of ether. The reaction mixture was cooled to 10° C. and 37.3 grams (0.10 mole) of O,O-dioctylphosphorosulfenyl chloride was added over a 30 minute period. The reaction mixture was stirred an additional hour at room temperature, filtered, and the solvent removed under reduced pressure. The product was concentrated to 50° C. at 2.0 mm. of Hg to yield 45.0 grams of N-(O,O-dioctylphosphorothio)-N-(isopropyl) - O,O-diethylphosphoramidate, $N_D^{25}=1.5550$, analyzing as 11.6% P and 5.1% S as compared to 11.7% P and 5.4% S theoretical.

EXAMPLE 9

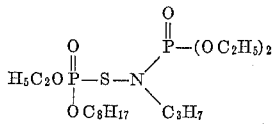

In a flask was placed 15.6 grams (0.08 mole) of N-isopropyl-O,O-diethylphosphoramidate and 10.1 grams (0.10 mole) of triethylamine in 100 ml. of benzene. The solution was held at room temperature while 23.0 grams (0.08 mole) of O-ethyl-O-octylphosphorosulfenyl chloride was added over a 30 minute period. The reaction mixture was stirred for two additional hours at room temperature and filtered before removing the solvent under reduced pressure. The product was concentrated to 60° C. at 2.0 mm. of Hg to yield 36.5 grams (94.5%) of N - [O-(ethyl)-O-(octyl)-phosphorothio]-N-(isopropyl)-O,O-diethylphosphoramidate, $N_D^{25}=1.4550$ analyzing as 13.1% P and 7.0% S as compared to 12.8% P and 6.7% S theoretical.

EXAMPLE 10

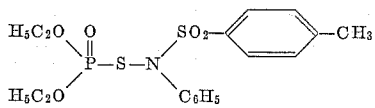

In a flask was placed 19.8 grams (0.08 mole) of N-(phenyl)-p-tolylsulfonamide in 150 ml. of ether. The solution was cooled to 20° C. and 16.3 grams (0.08 mole) of O,O-diethylphosphorosulfenyl chloride was added over a 20 minute period. The reaction mixture was stirred an additional hour at room temperature and then 15 minutes at the temperature of refluxing ether before filtering and removing the solvent under partial pressure. The product was concentrated to 50° C. at 1.0 mm. of Hg to yield 31.0 grams (93%) of N-(phenyl)-N-(O,O-diethylphosphorothio)-p-toluenesulfonamide analyzing as 7.3% P and 14.4% S as compared to 7.4% P and 15.3% S theoretical.

Using a procedure substantially in accordance with one or more of those procedures described in the above examples, the following specific compounds were prepared.

EXAMPLE 11

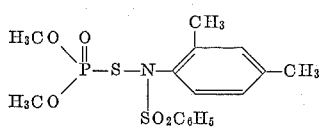

Yield=91.4%; percent P=7.1 (7.8 theory); percent S=14.4 (15.7 theory).

EXAMPLE 12

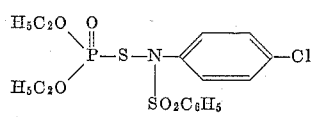

$N_D^{25}=1.5430$; yield=99%; percent P=6.6 (7.15 theory); percent S=13.2 (14.65 theory); percent Cl=7.5 (8.1 theory).

EXAMPLE 13

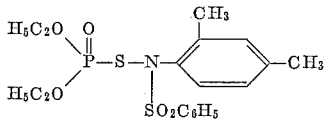

Yield=94.5%; percent P=6.1 (7.2 theory); percent S=13.7 (14.8 theory).

EXAMPLE 14

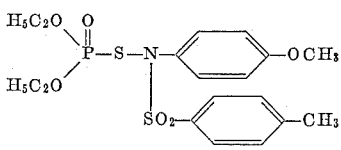

$N_D^{25}=1.5369$; yield=93.7%; percent P=7.4 (7.0 theory); percent S=13.4 (14.3 theory).

EXAMPLE 15

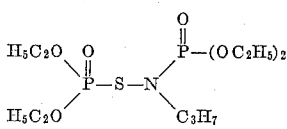

Yield=100%; percent P=16.0 (17.0 theory); percent S=7.8 (8.7 theory).

EXAMPLE 16

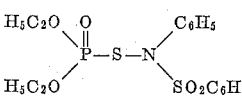

Yield=89%; percent P=7.7 (7.7 theory); percent S=15.3 (15.9 theory).

EXAMPLE 17

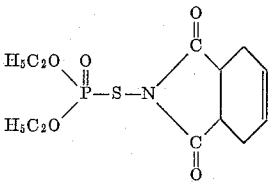

Percent P=9.3 (9.6 theory); percent S=9.7 (10.0 theory).

EXAMPLE 18

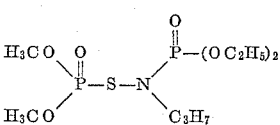

$N_D^{25}=1.4570$; Yield=97%; percent P=18.0 (18.4 theory); percent S=8.4 (9.45 theory).

EXAMPLE 19

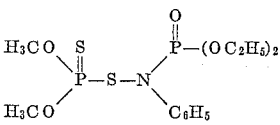

Yield=91%; percent P=15.8 (16.75 theory); percent S=7.9 (8.6 theory).

EXAMPLE 20

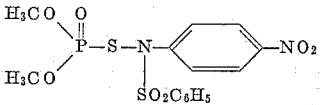

Percent P=6.9 (7.4 theory); percent S=13.7 (15.3 theory).

EXAMPLE 21

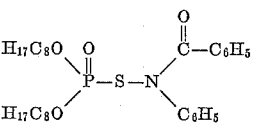

Yield=98%; percent P=5.6 (5.8 theory); percent S=5.6 (5.8 theory).

EXAMPLE 22

$$\begin{array}{c} H_3CO \\ \diagdown \\ H_3CO \end{array} \!\!\! \begin{array}{c} O \\ \| \\ P-S-N \end{array} \!\!\! \begin{array}{c} O \\ \| \\ C-CH_2 \\ | \\ C-CH_2 \\ \| \\ O \end{array}$$

Yield=96.5%; percent P=12.2 (12.9 theory); percent S=13.0 (13.4 theory).

EXAMPLE 23

$$\begin{array}{c} H_5C_2O \\ \diagdown \\ H_5C_2O \end{array} \!\!\! \begin{array}{c} O \\ \| \\ P-S-N \end{array} \!\!\! \begin{array}{c} C_6H_5 \\ \diagup \\ SO_2-\!\!\!\!\bigcirc\!\!\!\!-NO_2 \end{array}$$

Yield=98.2%; percent P=7.0 (6.9 theory); percent S=13.3 (14.3 theory).

EXAMPLE 24

$$\begin{array}{c} H_5C_2O \\ \diagdown \\ H_5C_2O \end{array} \!\!\! \begin{array}{c} O \\ \| \\ P-S-N-\!\!\!\!\bigcirc\!\!\!\!-NO_2 \\ | \\ Cl \\ | \\ SO_2C_6H_5 \end{array}$$

Yield=100%; percent P=7.0 (6.5 theory); percent S=6.6 (6.7 theory).

EXAMPLE 25

$$\begin{array}{c} H_5C_2O \\ \diagdown \\ H_5C_2O \end{array} \!\!\! \begin{array}{c} O \\ \| \\ P-S-N \end{array} \!\!\! \begin{array}{c} SO_2-C_6H_5 \\ \diagup \\ SO_2-C_6H_5 \end{array}$$

Yield=98%; percent P=6.6 (6.65 theory); percent S=20.4 (20.7 theory).

EXAMPLE 26

$$\begin{array}{c} H_3CO \\ \diagdown \\ H_3CO \end{array} \!\!\! \begin{array}{c} O \\ \| \\ P-S-N \end{array} \!\!\! \begin{array}{c} SO_2 \\ \diagup\diagdown \\ \diagdown\diagup \\ C \\ \| \\ O \end{array}$$

Yield=97%; percent P=9.3 (9.6 theory); percent S=17.2 (18.8 theory).

Pesticidal activity for the novel compounds of the invention is illustrated in Table I wherein the percentage kill among a group of test species is reported for a percentage concentration of toxicant in aqueous solution. A slanted line is used to separate the percentage kill among the test species, shown on the left, and the percentage concentration shown on the right.

Table I

| Compound (Example No.) | House Fly, Percent Kill/Percent Conc. | American Cockroach, Percent Kill/Percent Conc. | Spotted Milkweed Bug, Percent Kill/Percent Conc. | Confused Flour Beetle, Percent Kill/Percent Conc. |
|---|---|---|---|---|
| 3 | 100/0.1 | | | |
| 8 | 88/0.1 | | 20/0.1 | 80/0.1 |
| 15 | 84/0.1 | 60/0.1 | 10/0.05 | 100/0.1 |
| 18 | 100/0.1 | | 20/0.1 | 30/0.1 |

The following insect species were used:

(1) House fly—*Musca domestica* (Linn.)
(2) American cockroach—*Periplaneta americana* (Linn.)
(3) Spotted milkweed bug—*Oncopeltus fasciatus* (Dallas)
(4) Confused flour beetle—*Tribolium confusum* (Duvol)

In the tests for species numbered 1 to 4 above, from ten to twenty-five insects were caged in cardboard mailing tubes 3⅛" in diameter and 2⅝" tall. The cages were supplied with cellophane bottoms and screened tops. Food and water were supplied to each cage, except in the case of the confused flour beetle which was primarily tested to determine fumigant action. Dispersions of the test compounds were prepared by dissolving one half half gram of the toxic material in ten milliliters of acetone. This solution was then diluted with water containing 0.015% Vatsol (a sulfonate-type wetting agent) and 0.005% Methocel (methyl cellulose) as emulsifiers, the amount of water being sufficient to dilute the active ingredient to a concentration of 0.1% or below. The test insects were then sprayed with this solution. After twenty-four and seventy-two hours, counts were made to determine living and dead insects.

The compounds of the present invention were also tested for post-emergence herbicidal activity on some economically important plant species. The data obtained from such tests are reported in Table II wherein "0" indicates no appreciable herbicidal activty, "+" is slight injury, "++" is moderate injury, and "+++" is severe injury to plant life.

Table II

| Compound (Example No.) | Crabgrass | Pinto | Foxtail | Mustard |
|---|---|---|---|---|
| 3 | + | + | | |
| 8 | + | ++ | + | + |
| 15 | + | ++ | | |
| 18 | + | +++ | | |

The herbicidal tests were initiated approximately two weeks following emergence of the test plants. The method of application involved spraying on the plant foliage a 0.2% aqueous solution of the active compound to the point of run-off. The concentration of active material when spraying this solution was approximately 25 pounds per planted acre. The usual plant species employed in post-emergence herbicidal testing were foxtail, mustard, crabgrass, and pinto bean. Evaluation of herbicidal activity was accomplished after 14 to 19 days.

Although the specific examples show the use of aqueous solutions of the toxic compounds as insecticides and herbicides, they may also be used in the form of emulsions, non-aqueous solutions, wettable powders, vapors, and dusts as may be best suited to the conditions of use. For more specialized applications, the toxic material may even be used in a pure undiluted form.

Where used herein, the term "pest" is intended to embrace both animal and plant pests customarily controlled by chemical means and excluding the higher animals, the vertebrates, e.g., rodents, birds, and larger forms which are more commonly controlled by mechanical means such as traps.

The foregoing description is given for clearness of understanding only and no unnecessary limitations should be understood therefrom, as modifications will be obvious to those skilled in the art.

What we claim is:

1. A compound represented by the formula:

$$\begin{array}{c} R^1O \\ \diagdown \\ R^2O \end{array} \!\!\! \begin{array}{c} X \\ \| \\ P-S-N-P \\ | \\ R^3 \end{array} \!\!\! \begin{array}{c} Y \\ \| \\ \diagup \\ OR^5 \end{array} \!\!\! OR^4$$

wherein $R^1$, $R^2$, $R^4$, and $R^5$ are alkyl, $R^3$ is selected from the group consisting of lower alkyl and phenyl, and X and Y are selected from the group consisting of oxygen and sulfur.

2. The compound of the formula:

$$\begin{array}{c} H_3CO \\ \diagdown \\ H_3CO \end{array} \!\!\! \begin{array}{c} O \\ \| \\ P-S-N-P \\ | \\ C_3H_7 \end{array} \!\!\! \begin{array}{c} S \\ \| \\ \diagup \\ OC_2H_5 \end{array} \!\!\! OC_2H_5$$

3. The compound of the formula:

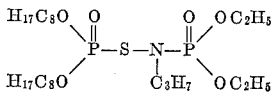

4. The compound of the formula:

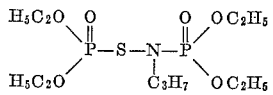

5. The compound of the formula:

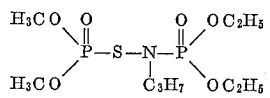

6. A method of preparing a compound of the formula

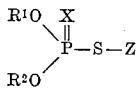

wherein $R^1$ and $R^2$ are alkyl, X is a member selected from the group consisting of sulfur and oxygen, and Z is a member selected from the group consisting of benzsulfonimido, phthalimido, succinimido, and

wherein $R^3$ is a member selected from the group consisting of phenyl, lower alkyl, alkylphenyl, dialkylphenyl, halophenyl, nitrophenyl, alkoxyphenyl, nitrohalophenyl, phenylsulfonyl, halophenylsulfonyl, nitrophenylsulfonyl, benzoyl, alkylphenylsulfonyl, dialkylphenylsulfonyl, and acetyl, and $R^4$ is a member selected from the group consisting of phenylsulfonyl, halophenylsulfonyl, alkylphenylsulfonyl, dialkylphenylsulfonyl, nitrophenylsulfonyl, dialkylphosphorothionyl, and dialkylphosphoryl, which comprises reacting at a temperature within the range of about —100° C. to about 100° C. an O,O-dialkylphosphorosulfenyl halide with a substantially stoichiometric amount of a compound selected from the group consisting of benzsulfonimide, phthalimide, succinimide, and a compound of the formula

where $R^3$ and $R^4$ are as defined hereinbefore.

7. The method set forth in claim 6 wherein reaction is accomplished in the presence of a non-aqueous organic solvent selected from the group consisting of ether, benzene, hexane, and carbontetrachloride.

8. The method set forth in claim 6, wherein reaction is accomplished in the presence of a hydrogen halide acceptor selected from the group consisting of triethylamine and pyridine.

9. The method set forth in claim 6 wherein the reaction temperature is maintained between —20° C. and 50° C.

References Cited in the file of this patent
UNITED STATES PATENTS

| | | |
|---|---|---|
| 2,841,486 | Osborn et al. | July 1, 1958 |
| 2,865,949 | McConnell et al. | Dec. 23, 1958 |
| 2,911,335 | Gilbert | Nov. 3, 1959 |
| 2,965,467 | Markley | Dec. 20, 1960 |
| 2,965,666 | Debo | Dec. 20, 1960 |
| 2,970,940 | Jones et al. | Feb. 7, 1961 |